United States Patent
Mathews

(10) Patent No.: US 6,174,219 B1
(45) Date of Patent: Jan. 16, 2001

(54) METHOD FOR MATCHING THE SPOOL VALVE LANDS IN A FUEL INJECTOR

(75) Inventor: Will W. Mathews, Greenfield, IN (US)

(73) Assignee: Navistar International Transportation Corp, Chicago, IL (US)

(*) Notice: Under 35 U.S.C. 154(b), the term of this patent shall be extended for 0 days.

(21) Appl. No.: 09/360,878

(22) Filed: Jul. 23, 1999

(51) Int. Cl.⁷ .................................................. B24B 49/00
(52) U.S. Cl. .................................. 451/8; 451/6; 73/119 A
(58) Field of Search .................................. 451/5, 6, 8, 28, 451/51; 73/119 A

(56) References Cited

U.S. PATENT DOCUMENTS

| | | |
|---|---|---|
| 3,900,777 | 8/1975 | Sumi et al. . |
| 4,091,573 | 5/1978 | Schmidt . |
| 4,274,230 | 6/1981 | Thalheim . |
| 4,499,876 * | 2/1985 | Yamamoto ............................. 123/446 |
| 4,646,563 * | 3/1987 | Jones ................................... 73/119 A |
| 5,012,574 * | 5/1991 | Pryor ................................... 29/888.06 |
| 5,031,304 | 7/1991 | Shepard et al. . |
| 5,103,595 | 4/1992 | Dale et al. . |
| 5,460,329 | 10/1995 | Sturman . |
| 5,472,368 | 12/1995 | Zollig . |
| 5,479,901 | 1/1996 | Gibson et al. . |
| 5,640,987 | 6/1997 | Sturman . |
| 5,720,261 | 2/1998 | Sturman et al. . |
| 5,868,165 * | 2/1999 | Tranovich ......................... 137/625.23 |
| 5,871,391 * | 2/1999 | Pryor ........................................ 451/9 |

OTHER PUBLICATIONS

C. Cole, O.E. Sturman, D. Giordano, Application of Digital Valve Technology to Diesel Fuel Injection, Society of Automative Engineers, Inc., 1999–01–0196, pp. 1 to 7.

* cited by examiner

Primary Examiner—David A. Scherbel
Assistant Examiner—Hadi Shakeri
(74) Attorney, Agent, or Firm—Dennis Kelly Sullivan; Jeffrey P. Calfa

(57) ABSTRACT

A method is described for matching the lands in a spool valve (300) for a fuel injector. The spool valve (300) has a valve body (340) forming an inside surface (373) to receive the spool (310). The inside surface is measured to locate the position of contact points on the valve body (340). A starting contact point (514) is selected from the contact points on the valve body (340). The starting contact point (514) is transposed to the spool (310). The other contact points are transposed to the spool (300), preferably by using the distances between the other contact points and the starting contact point on the valve body. Grind areas are identified on the spool (310) based on the starting contact point, the other contact points, and specifications for the spool. The grind areas are ground to form lands on the spool (310) that match lands on the valve body (340). Alternatively, the lands on the valve body (340) are made based on the contact points of the spool (310)

38 Claims, 6 Drawing Sheets

METHOD FOR MATCHING THE SPOOL VALVE LANDS IN A FUEL INJECTOR

FIELD OF THE INVENTION

The present invention relates generally to control valves for fuel injection systems. More particularly, the present invention relates to spool valves used in fuel injectors for internal combustion engines.

BACKGROUND OF THE INVENTION

Consumers are demanding greater fuel economy and lower exhaust emissions from internal combustion engines. One way to increase fuel economy and reduce emissions is to improve the fuel system. A key component of the fuel system is the fuel injector, which injects pressurized fuel into the combustion chamber. Consequently, engine manufacturers are seeking improved fuel injectors for enhancing the performance of internal combustion engines.

To enhance engine performance, advance fuel injectors deliver fuel at higher injection pressures. They also provide better control of the injection rate and timing. To obtain the higher injection pressure, advanced fuel injectors operate with a higher hydraulic input pressure than earlier injector designs. The hydraulic input pressure can be as high as 6,000 psi. Advanced fuel injectors use the higher pressure to operate an intensifier piston for delivering fuel at injection pressures as high as 21,000 psi. To better control the injection rate and timing, advanced fuel injectors are electronically controlled and hydraulically actuated. Earlier injector designs are mechanically actuated.

Several advanced fuel injectors use a spool valve to control the flow of hydraulic fluid. FIGS. 1 and 2 show fuel injectors incorporating spool valves according to the prior art. Generally, spool valves are used in hydraulic and pneumatic systems to control and divert fluid flow. In a typical design, a spool valve has a spool positioned to reciprocate inside a valve body. To start fluid flow, the spool is moved to a position where the grooves on the spool are adjacent to grooves on the valve body. To stop fluid flow, the spool is moved to a position where lands on the spool are adjacent to lands on the valve body. The benefit of the spool valve is its ability to change the fluid flow with only a small change in the position of the spool. This ability to change the fluid flow provides better control and timing of the fuel injector.

To manufacture spool valves, pre-formed valve bodies and spools are machined individually according to specifications for the valve. Lathes, grinding machines, and other similar equipment cut grooves to form lands on the valve bodies and spools. The outside diameters of the spool are machine ground to match the inside diameters of the valve bodies. Finally, the valve body and spool are assembled. However, the precision with which the lands on the spool match the lands on the valve body is important for proper operation of the spool valve.

To compensate for mismatched lands, some applications adjust the position of the spool within the valve body to match the spool and body lands. This adjustment requires extra space for the spool in the valve body and usually a means to hold the spool in the proper position. Another approach is to increase the width of the lands to accommodate any mismatched lands. The larger width creates a larger "dead zone" in the spool valve. A larger dead zone reduces the transition time of the spool valve. This approach also increases the size of the spool valve. In some applications, mismatch lands have a minimal affect on the application. Sometimes, the control and timing offered by matched lands is of little benefit to the application.

In contrast, a spool valve for a fuel injector must have matched lands for proper timing and control. If the lands do not match properly, they may not stop or start hydraulic fluid at the appropriate time. They may start hydraulic fluid at an insufficient pressure or volume. They may cause to the hydraulic fluid to stop slower. Moreover, if the lands are not precisely matched in relation to the other lands, the spool valve may start or stop hydraulic fluid at one point before it stops or starts hydraulic fluid at another point. These problems affect the timing and control of the fuel injector as well as the energy efficiency of the engine. Improper diversions of hydraulic fluid from mismatched lands cause an energy loss in the engine. They also generate heat in the hydraulic fluid.

In addition, the higher hydraulic input pressure of advanced fuel injectors increases the adverse effects of mismatched lands. The higher hydraulic pressure aggravates any problem with the lands even if the condition only occurs in the brief microsecond when the spool is opened or closed.

Current methods to compensate for mismatched lands do not work well for spool valves used in fuel injectors. The size of the fuel injector does not permit lengthening the spool to expand the dead zones. In addition, there is little or no room to reposition the spool in the valve body for proper matching. A typical valve body has a length of 1.0 in. (25 mm). A typical spool has a length of 0.8 in. (20 mm) and a diameter of 0.25 in. (6.3 mm). Tolerances for successful operation of a typical spool valve are $\pm 1.0 \times 10^{-4}$ in. (0.0025 mm). These sizes and tolerances make regrinding difficult if not impossible.

Moreover, the "multiple" control operation of a spool valve for a fuel injector requires matching lands at multiple points almost simultaneously. In a typical fuel injector design, one set of lands must stop the flow of hydraulic fluid at the same time or slightly before a second set of lands starts the hydraulic flow. At another time, two or more sets of lands must start the hydraulic flow to hydraulic conduits at essentially the same time. In this design, simply repositioning or lengthening the spool will not correct for mismatched lands.

The need for matched lands makes the production of spool valves for fuel injectors very difficult. To obtain a properly working spool valve, the spool may be ground many times. Even then, the regrinding may not work because of the size and position of the lands on the spool.

Accordingly, there is a need for a method to match the lands in a spool valve for a fuel injector. In particular, there is a need to match the lands on the spool with the lands on the valve body when the spool valve is made.

SUMMARY OF THE INVENTION

The present invention provides a method for matching spool valve lands in a fuel injector. The spool valve has a valve body forming an inside surface to receive the spool. The inside surface is measured to determine the locations of contact points along the inside surface of the valve body. Contact points are places where the lands on the valve body connect with lands on the spool to stop and start hydraulic fluid flow in the spool valve.

A starting contact point is selected from the contact points on the valve body. The starting contact point is transposed onto the spool. The starting contact point is transposed by measuring the distance to the starting contact point on the valve body and the spool from a common reference position. In an alternate embodiment, the starting contact point is transposed by selecting an arbitrary position on the spool to be the starting contact point.

The other contact points are transposed onto the spool. The other contact points may be transposed by measuring the distances of the contact points on the valve body and the spool from a common reference position. The other contact points may be transposed by using the distances between the other contact points and the starting contact point on the valve body.

Grind areas are identified on the spool based on the starting contact point, the other contact points, and specifications for the spool. The grind areas are locations for removing material from the spool to form spool grooves, which in turn form the lands on the spool. In addition, the spool datum are qualified based on the location of the starting contact point on the spool.

Alternatively, the lands on the valve body are made based on the contact points of the spool. The inside surface of the valve body is formed to receive the spool. The spool grooves are machined or ground on the spool according to specifications for the spool. The contact points on the spool are located. A starting contact point is selected. The starting contact point and the other contact points are transposed onto the valve body. Grind areas are identified on the valve body based on the starting contact point, the other contact points, and specifications for the valve body. The grind areas are ground to form grooves on the valve body, thus forming the lands on the valve body.

The following drawings and description set forth additional advantages and benefits of the invention. More advantages and benefits are obvious from the description and may be learned by practice of the invention.

BRIEF DESCRIPTION OF THE DRAWINGS

The present invention may be better understood when read in connection with the accompanying drawings, of which.

DETAILED DESCRIPTION OF THE INVENTION

Figure 1:
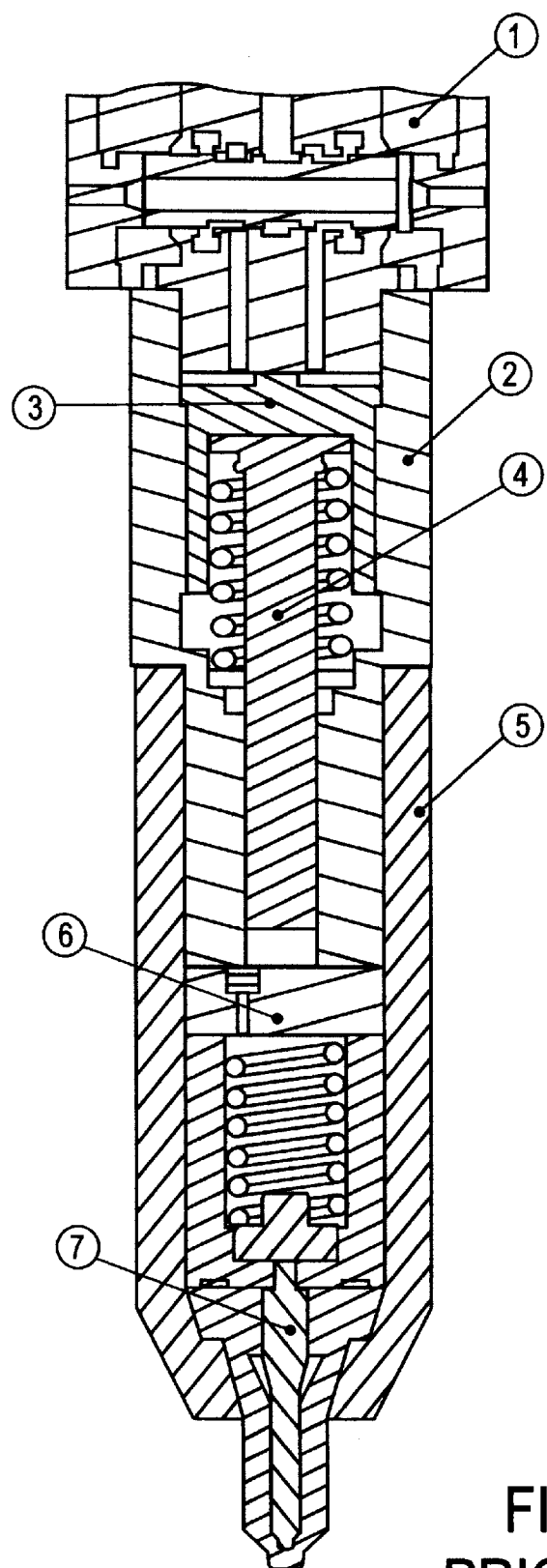
FIG. 1 is a cross-sectional view of a first fuel injector with a spool valve according to the prior art.
Figure 2:
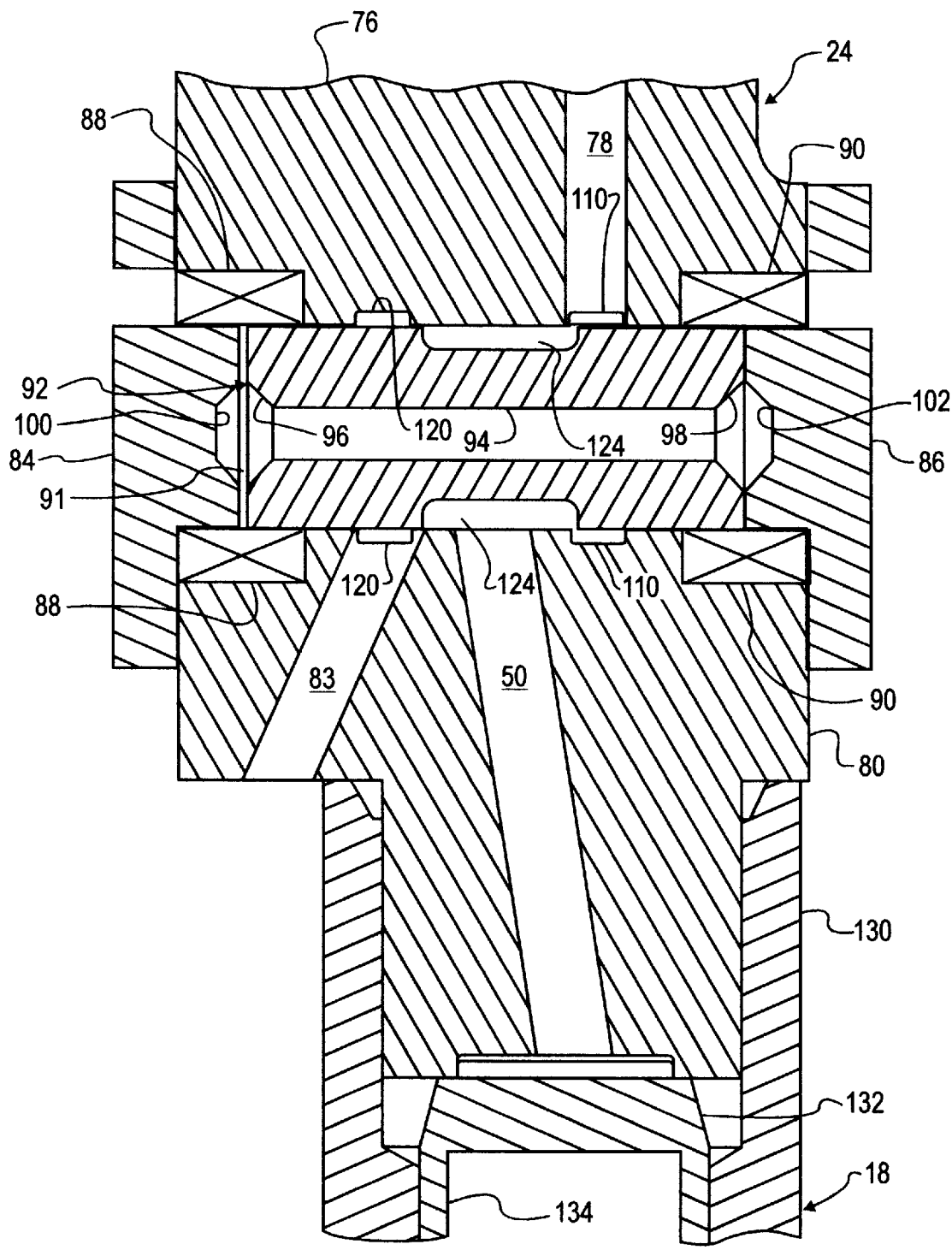
FIG. 2 is a cross-sectional view of a second fuel injector with a spool valve according to the prior art.
Figure 3:
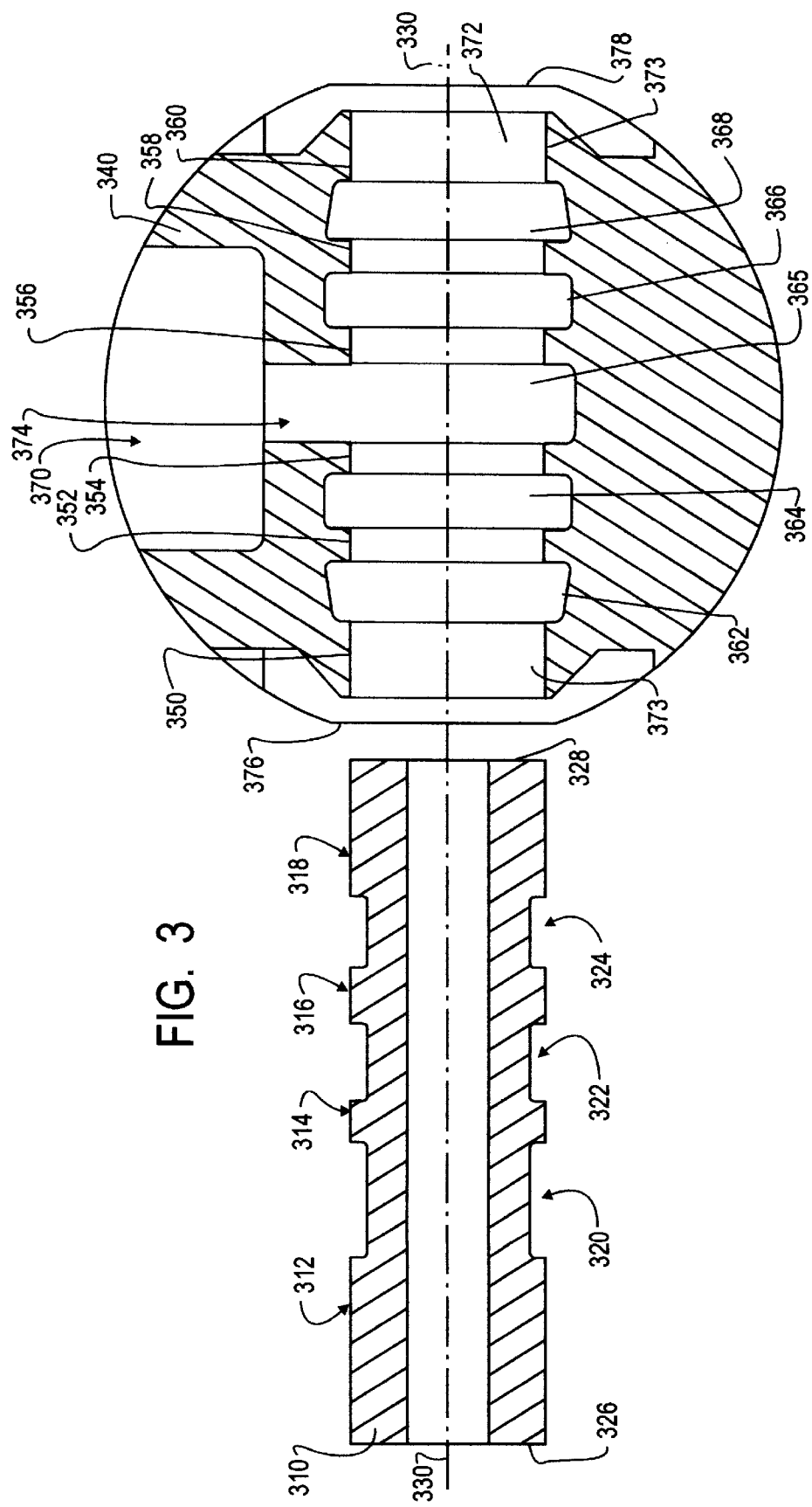
FIG. 3 is cross-sectional view of an unassembled spool valve manufactured according to the method of the present invention.

The method of the present invention is better understood when described in relation to a spool valve used in a fuel injector. FIG. 3 shows a spool valve 300 manufactured according to the method of the present invention. Spool valve 300 is shown unassembled having spool 310 and valve body 340. While the method of the present invention may be used to manufacture spool valve 300, the method is not limited to the production of spool valves such as spool valve 300. It is understood the method of the present invention may be used to manufacture spool valves of varying designs and configurations including those with more or less grooves or lands, those not symmetrical, and those of different shapes. It is also understood the method may be used to manufacture other machined parts and shapes having similar requirements of a spool valve.

Referring to FIG. 3, spool 310 is cylindrical in shape. In use, spool 310 is positioned within cavity 372 of valve body 340 for reciprocating along centerline 330. Spool 310 has spool grooves 320, 322, 324 formed radially along centerline 330. The formation of spool grooves 320, 322, 324 creates spool lands 312, 314, 316, 318 radially along centerline 330. The spool lands have essentially the same diameter and form the outside diameter of spool 310. Spool 310 has left datum 326 and right datum 328 formed substantially perpendicular to centerline 330.

Valve body 340 has cavity 372, which is cylindrically shaped and sized to receive spool 310. Body grooves 362, 364, 365, 366, 368 are formed on valve body 340 inside cavity 372 and substantially perpendicular to centerline 330. The body grooves connect to conduits in a fuel injector (not shown). In the fuel injector using spool valve 300, body grooves 362, 368 connect to conduits leading to the hydraulic fluid reservoir (not shown). Body grooves 364, 366 connect to conduits leading to the intensifier piston (not shown). Body groove 365 connects to conduit 370 via bore 374. Conduit 370 connects to a hydraulic line (not shown), which supplies hydraulic fluid to spool valve 300. The formation of body grooves 362, 364, 365, 366, 368 creates body lands 350, 352, 354, 356, 358, 360 radially along centerline 330. The body lands form an inside surface 373 on valve body 340. Inside surface 373 has an inside diameter along centerline 330.

Figure 4:
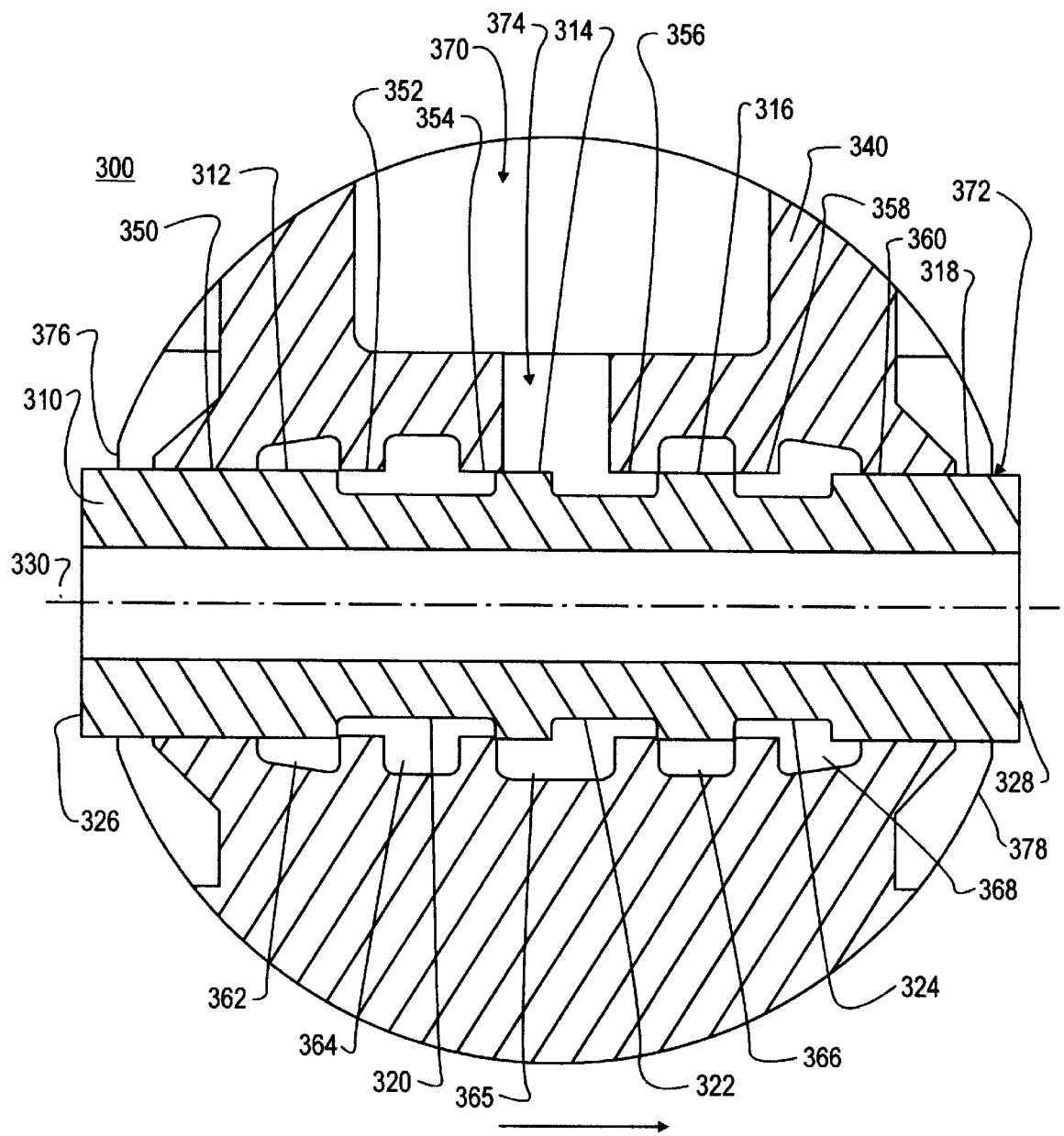
FIG. 4 is cross-sectional view of an assembled spool valve manufactured according to the method of the present invention.

FIG. 4 shows spool valve 300 assembled in its operating mode with spool 310 positioned inside cavity 372 of valve body 340. Spool 310 is positioned where spool valve 300 may be opened or closed depending on the next direction spool 310 is moved. To open spool valve 300, spool 310 is moved in the direction of the arrow. When opened, hydraulic fluid flows from conduit 370 through bore 374 into spool grooves 320, 322. The hydraulic fluid flows through body grooves 364, 366 into respective conduits leading to the intensifier piston (not shown). The hydraulic fluid causes the intensifier piston to compress. To close spool valve 300, spool 310 is moved in the opposite direction of the arrow. When closed, hydraulic fluid no longer flows from conduit 370 to the intensifier piston. Rather, hydraulic fluid flows from the intensifier piston through conduits into body grooves 364, 366. From the body grooves, the fluid flows into spool grooves 320, 324. The hydraulic fluid then flows through body grooves 362, 368 into conduits leading to the hydraulic fluid reservoir (not shown). This release of the hydraulic fluid releases the intensifier piston in the fuel injector.

Figure 5:
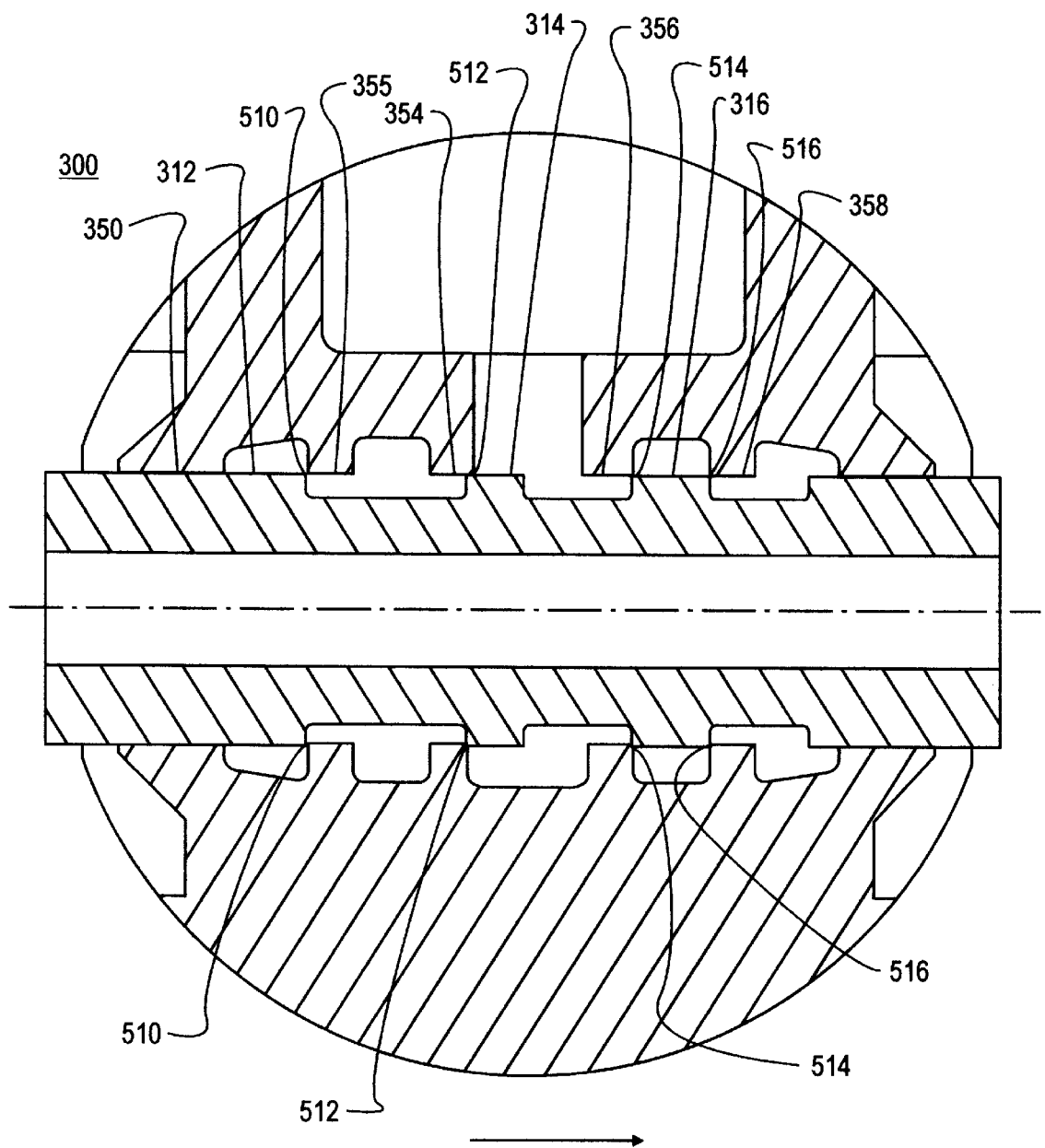
FIG. 5 is cross-sectional view of an assembled spool valve manufactured according to the method of the present invention.

FIG. 5 is the same as FIG. 4 except several part numbers are omitted. For proper operation of the spool valve and its associated fuel injector, the spool and body lands must engage and disengage at the proper location and time. Upon opening, spool land 312 engages body land 355 at critical contact point 510. Spool land 316 engages body land 358 at critical contact point 516. At the same time or afterwards, spool land 314 disengages from body land 354 at critical contact point 512. Spool land 316 disengages from body land 356 at critical contact point 514. In this design, the disengagement of lands at critical contact point 512 must occur substantially at the same time as the disengagement of lands at critical contact point 514 for the hydraulic fluid to flow at the same time to the intensifier piston in the fuel injector. In addition, the disengagement of lands at critical contact points 512 and 514 must occur substantially at the same time or after the engagement of lands at critical contact points 510 and 516. Otherwise, some or all of the hydraulic fluid may flow to the hydraulic fluid reservoir at the time it is supposed to flow to the intensifier piston.

In these figures, the critical contact points are shown on the corners of the respective lands. However, a critical contact point is the location on the land where the hydraulic fluid is effectively stooped or started when the land connects with another land. A critical contact point may be some position on the land away from the corner. The locations of the critical contact point may be designed into specifications for the spool valve. They may be adjusted to accommodate variances in the manufacturing technique the precision and accuracy of the grinding or machining equipment. It is understood there are other contact points between the lands in spool valve 300. Other spool designs may have different contact points.

Upon closing, spool land 314 engages body land 354 at critical contact point 512. Spool land 316 engages body land 356 at critical contact point 514. At the same time or afterwards, spool land 312 disengages from body land 355 at critical contact point 510. Spool land 316 disengages from body land 358 at critical contact point 516. In this design, the engagement of lands at critical contact points 512 and 514 must occur substantially at the same time for the hydraulic fluid to stop flowing at the same time to the intensifier piston. In addition, the engagement of lands at critical contact points 512 and 514 must occur substantially at the same time or before the disengagement of lands at critical contact points 510 and 516. Otherwise, some or all of the hydraulic fluid may flow to the hydraulic fluid reservoir at the time it is supposed to flow to the intensifier piston.

For the spool valve to operate properly, the engagement and disengagement of lands at critical contact points 512 and 514 must happen essentially at the same time. Similarly, the engagement and disengagement of lands at critical contact points 510 and 516 must happen substantially at the same time. These lands also must engage and disengage at the appropriate time in relation to the engagement and disengagement of lands at critical contact points 512 and 514. To ensure correct timing for engagement and disengagement of the lands, the spool lands must "match" or be positioned correctly in relation to the location of the body lands and other spool lands.

The method of the present invention matches the location of the spool and body lands so the appropriate lands engage and disengage at the correct time. Valve bodies and spools are pre-formed metal parts. Preferably, they are castings. However, they may be made by other preforming techniques such as forging, investment casting, and powder metals. The valve body is typically a solid piece of metal at start. In contrast the spool may be a solid piece of metal or a tube with sufficient wall thickness for the spool grooves. The valve bodies and spools may be made from steel, iron, other metals, and composites. Preferably, they are made from SAE 4140 steel.

Figure 6:
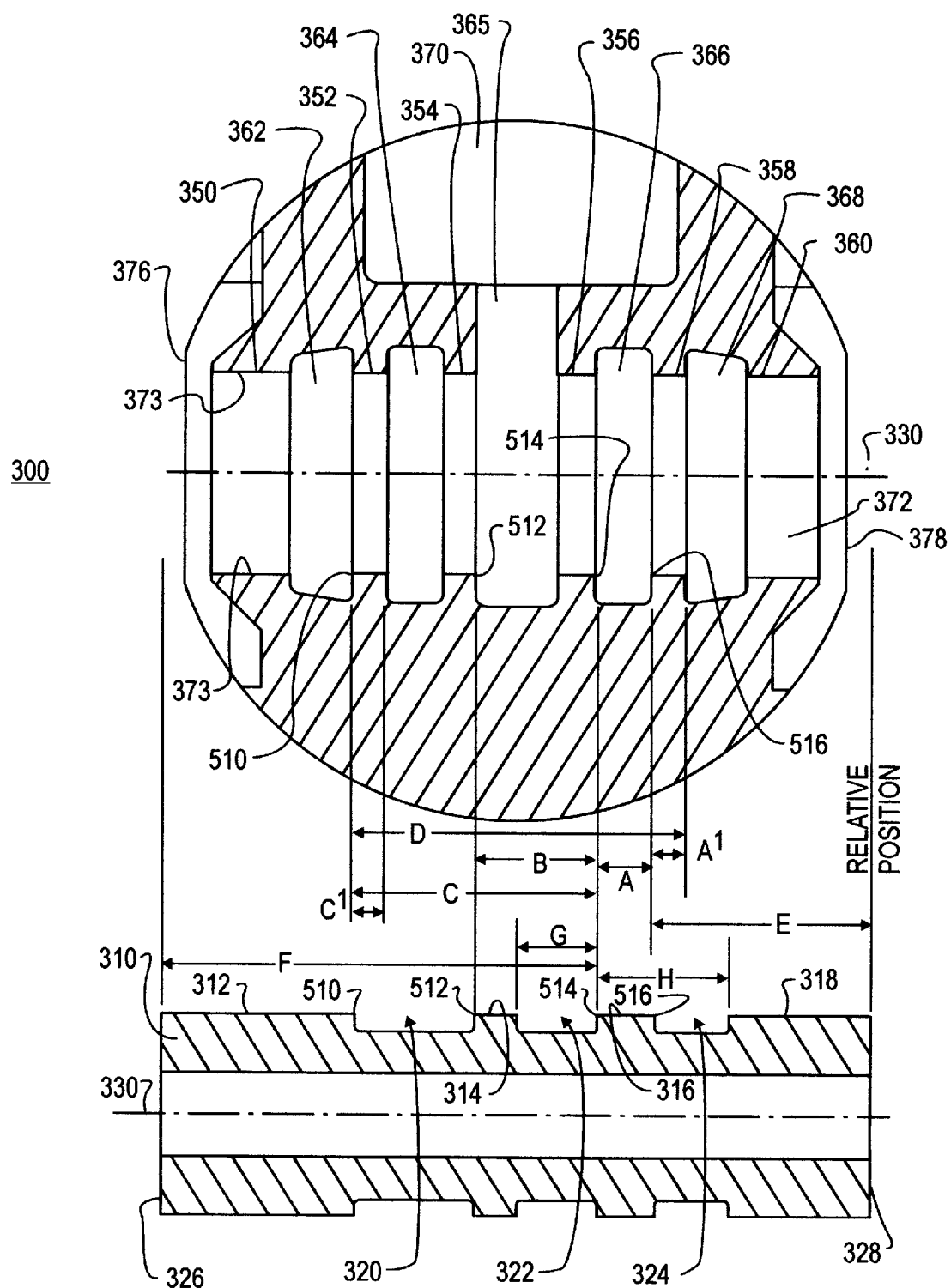
FIG. 6 is cross-sectional view of an unassembled spool valve manufactured according to the method of the present invention.

Referring now to FIG. 6, a preformed metal part is drilled to make valve body 340. A boring device forms cavity 372 in valve body 340. The boring device may be a drill, lathe, boring machine, or similar machine tool. The same or similar boring device is used to machine body grooves 362, 364, 365, 366, 368 on the inside surface 373 of valve body 340. From the creation of the body grooves, body lands 350, 352, 354, 356, 358, 360 are formed on the inside surface 373 of valve body 340. Other boring devices may be used to produce a finished surface inside valve body 340.

The inside surface 373 of valve body 340 is measured to the location of each body groove and body land. Inside surface 373 may be measured using mechanical, pneumatic, electronic, laser, and ultrasound gauging techniques. Preferably, an inside diameter gauge is used to measure the inside diameter along centerline 330. Basically, a change in the inside diameter indicates the beginning or ending of a body groove or land. Body grooves are located in portions of the valve body where the inside diameter is larger.

To properly identify the lands, the measurements may be compared to specifications for the valve body. Additionally, the measurements may be used to confirm the dimensional integrity of inside surface 373. The inside surface 373 and body grooves may be reground to correct any discrepancies.

Valve body 340 preferably is positioned in a jig for rotating about the centerline 330. The diameter gauge or other measuring device remains stationary radially and moves axially along centerline 330.

In an alternate embodiment, valve body 340 is fixed in the jig. The diameter gauge rotates along the inside of valve body 340 while it moves axially along centerline 330.

In either embodiment, the inside diameter gauge may be read manually to determine the locations of the body grooves and lands. Preferably, a microprocessor (not shown) is connected to the inside diameter gauge for reading and recording the inside diameter readings. The body grooves are defined by the edges of the body lands. Where one body land ends a body groove starts. Hence, the starting and ending positions of the body grooves also are the starting and ending positions of the lands.

In addition, body grooves and lands may be less than perpendicular to centerline 330. The microprocessor calculates the start and end of each body groove/land using a mean best-fit plane approximation technique. This technique determines the plane perpendicular to centerline 330 that has the best fit for coinciding with the start or end of the body groove/land.

From the measurements of inside surface 373, the microprocessor determines the distances between critical contact points 510, 512, 514, 516 on valve body 340. The microprocessor may determine every conceivable distance between the critical contact points. Preferably, the microprocessor determines only the distances needed to make spool 310. For example, the microprocessor would need distances A, B, and C or distances A, B, and D in FIG. 6 to make spool 310. The remaining dimensions could be provided by specifications of the spool. The microprocessor may also determine other distances according to the specifications and design of the pool valve. Such distances include the starting or ending points for other body grooves and the location of the left edge 376 or right edge 378 of valve body 340. In place of a microprocessor, the distances and other calculations may be performed manually.

The distances between the critical contact points on valve body 340 are then used to make spool 310. A preformed metal part is mounted in a lathe, grinding machine, or similar machine tool. The metal part is ground or machined until its outside diameter is less than the measured inside diameter of valve body 340.

To determine the location of the spool grooves, one of the critical contact points on valve body 340 is chosen as the starting contact point. In this case, critical contact point 514 is the starting contact point. It is understood that any of the other critical contact points could be used as the starting contact point. It also is understood that the critical and starting contact points may be different for different spool designs.

In one embodiment, the measurements of the inside surface and specifications for the valve are used to locate the position of starting contact point 514 on valve body 340. The distance of starting contact point 514 from a reference position is used to transpose the location of starting contact point 514 to spool 310. Starting contact point 514 is located on spool 310 at the same distance from the reference position. The reference position could the alignment of an edge 376, 378 of valve body 340 with a datum 326, 328 of spool 310. The edge 376, 378 maybe offset from the datum 326, 328 depending on the operation and specification of the spool valve. The reference position could be another critical contact point or another part of spool valve 310. The positions of the other critical contact points maybe transposed from valve body 340 to spool 310 in a similar manner as the starting contact point. Alternatively, the other critical contact points may be located on spool 310 by measuring their respective distances on valve body 340 from the starting contact point. These distances then are used to locate the other critical contact points on spool 310.

Preferably, starting contact point 514 is located arbitrarily on spool 310. The position maybe chosen to correspond closely with the specifications in order to minimize the amount of scrap generated during the manufacture of spool 300. The other critical contact points may be located on spool 310 by measuring their respective distances on valve body 340 from the starting contact point. These distances then are used to locate the other critical contact points on spool 310.

From the locations of starting contact point 514 and the other critical contact points, grind areas are identified on spool 310. Grind areas are locations for removing material from spool 310 to form the spool grooves. The grind areas or spool grooves may be identified by the critical contact points and/or specifications the spool valve 300.

For example, critical contact points 510 and 512 identify the grind area for spool groove 320. In contrast, the grind area for spool groove 322 is identified by starting contact point 514 and specifications for spool 310.

The grind areas are ground or machined sequentially or concurrently. While grinding and machining are different processes, a reference to one also indicates a reference to the other because either or both may be used to remove material from spool 300. Similar processes may be used. In addition, contact gauges are used to confirm whether the correct amount of material was removed from the proper location. The spool grooves are ground to depths according to specifications for spool 310.

In FIG. 6, spool groove 324 is ground starting at a distance A from starting contact point 514 and ending at a distance H from starting contact point 514. Distance A is the distance between critical contact point 514 and critical contact point 516 as measured on valve body 340. Distance H is the distance between critical contact point 514 and the start of spool land 318 according to the specifications for spool 310.

Alternatively, spool groove 324 is ground starting at a distance A plus A' from starting contact point 514. Distance A' is an adjustment to the location of critical contact point 516. This adjustment ensures the lands engage at critical contact point 516 prior to the disengagement of lands at critical contact points 512 and 514. It also ensures the lands disengage at critical contact point 516 after the engagement of lands at critical contact points 512 and 514. Distance A' is a predetermined value based upon a number of factors including the accuracy and precision of the machining equipment.

Spool groove 320 is ground starting at a distance B from starting contact point 514 and ending at a distance C from starting contact point 514. Distance B is the distance between critical contact point 514 and critical contact point 512 as measured on valve body 340. Distance C is the distance between critical contact point 514 and critical contact point 510 as measured on valve body 340. Alternatively, the grinding of spool groove 320 ends at distance D from critical contact point 516. Distance D is the distance between critical contact point 516 and critical contact point 510 as measured on valve body 340.

Alternatively, the grinding of spool groove 320 ends at a distance C less C' from starting contact point 514. Distance C' is an adjustment to the location of critical contact point 510. This adjustment ensures the lands engage at critical contact point 510 prior to the disengagement of lands at critical contact points 512 and 514. It also ensures the lands disengage at critical contact point 510 after the engagement of lands at critical contact points 512 and 514. Distance C' is a predetermined value based upon a number of factors including the accuracy and precision of the machining equipment. Distance D also may be adjusted by C' in a similar manner as distance C.

Spool groove 322 is ground starting at the starting contact point 514 and ending a distance G from the starting contact point 514. Distance G is the distance between critical contact point 514 and the start of spool land 314 according to specifications for spool 310.

After grinding the spool grooves, the right datum and left datum are qualified using starting contact point 514 and specifications for spool valve 300. Right datum 328 is qualified at a distance E from the starting contact point 514. Distance E is the distance between the starting contact point 514 and right datum 328 according to the specifications for spool 310. In addition, distance E may be adjusted to account for any difference between the measured distance and the specified distance between critical contact point 514 and the right edge 378 of valve body 340.

Left datum 326 is qualified at a distance F from the starting contact point 514. Distance F is the distance between the starting contact point 514 and left datum 326 according to the specifications for spool 310. In addition, distance F may be adjusted to account for any difference between the measured distance and the specified distance between critical contact point 514 and the left edge 376 of valve body 340.

Spool 310 is removed from the grinding machine. Excess material is cut-off at the left datum 326 and right datum 328. If needed, any finish grinding and polishing is completed. Spool 310 is inserted into valve body 340 to complete the assembly of spool valve 300.

As described, the grinding of grooves in spool 310 may occur after measuring the inside of valve body 340. However, the grinding of grooves on spool 310 may coincide with the measuring of valve body 340. The method also may be used in the manufacture of other parts with similar requirements as a spool valve.

In an alternate embodiment, the body grooves may be ground based on the location of critical contact points on the spool. For example, body groove 366 may be ground based on the location of critical contact points 514 and 516 on spool 310. At the start, valve body 340 is formed to receive spool 310. Either or both of valve body 340 and spool 310 may be ground for the outside diameter of spool 310 to match the inside diameter of valve body 340. Spool groove 324 and spool groove 322 are machined or ground on spool 310 to form spool land 316. The outside diameter of spool 310 is measured to determine the position of critical contact points 514 and 516. The position of critical contact points 514 and 516 on the spool is transposed to the inside surface of valve body 340. Groove 366 is machined or ground into valve body 340 based on the location of critical contact points 514 and 516. The remaining grooves on valve body 340 are machined or ground based on the positions of critical contact points 514 and 516. These steps may be repeated concurrently or sequentially for other lands and contact points.

While the invention has been described and illustrated, this description is by way of example only. Additional advantages will readily occur to those skilled in the art, who may make numerous changes without departing from the true spirit and scope of the invention.

Therefore, the invention is not limited to the specific details, representative devices, and illustrated examples in this description. Accordingly, the scope of the invention is to be limited only as necessitated by the accompanying claims.

What is claimed is:

1. A method for matching lands in a spool valve for a fuel injector, wherein the spool valve has a valve body forming an inside surface having an inside diameter to receive a spool having outside diameter, specifications defining the inside surface of the valve body, the valve body having a contact point at a location where a body land connects with a spool land formed by a spool groove on the spool, the method comprising the steps of:
   (a) measuring the inside surface;
   (b) determining the location of the contact point on the valve body;
   (c) identifying a grind area on the spool based on the location of the contact point on the valve body; and
   (d) grinding the grind area to form the spool groove and the spool land.

2. A method according to claim 1, wherein the step (a) of measuring the inside surface further comprises the substep of moving a measurement device axially along the inside surface.

3. A method according to claim 2, wherein the step (a) of measuring the inside surface further comprises the substep of rotating the valve body.

4. A method according to claim 1, wherein the step (a) of measuring the inside surface further comprises the substep of confirming that the inside surface conforms to specification for the valve body.

5. A method according to claim 1, wherein the step (a) of measuring the inside surface further comprises the substep of grinding the outside diameter of the spool to match the diameter of the inside surface.

6. A method according to claim 1, wherein the step (b) of determining the location further comprises the substeps of;
   (b1) identifying start and end positions of the body land; and
   (b2) comparing the start and end positions to specifications for the valve body.

7. A method according to claim 6, wherein the substep (b1) of identifying start and end positions includes performing a mean best-fit plane approximation technique.

8. A method according to claim 1, wherein the step (c) of identifying a grind area further comprises the substeps of:
   (c1) transposing the location of the contact point from the valve body onto the spool; and
   (c2) determining the grind area according to the location of the contact point on the spool and specifications for the spool.

9. A method according to claim 8, wherein the substep (c1) of transposing the location includes determining the location of the contact point on the valve body and the location of the contact point on the spool in relation to a reference position.

10. A method according to claim 9, wherein the reference position is an edge of the valve body aligned with a datum of the spool.

11. A method according to claim 8, wherein the substep (c1) of transposing the location includes adjusting the location of the contact point on the spool.

12. A method according to claim 1, further comprising the step of:
   (e) qualifying at least one datum based upon the location of the contact point.

13. A method for matching lands in a spool valve for a fuel injector, wherein the spool valve includes a valve body forming an inside surface to receive a spool, the valve body having a first contact point at a first location where a first body land connects with a first spool land formed by a first spool groove on the spool, the valve body having a second contact point at a second location where a second body land connects with a second spool land formed by a second spool groove on the spool, the method comprising the steps of:
   (a) measuring the inside surface;
   (b) determining the first location and the second location on the valve body;
   (c) identifying a first grind area and a second grind area on the spool, the first grind area based on the first location, the second grind area based on the second location; and
   (d) grinding the first grind area and the second grind area, wherein grinding the first grind area forms the first spool groove and the first spool land, and wherein grinding the second grind area forms the second spool grove and the second spool land.

14. A method according to claim 13, wherein the step (b) of determining the first location and the second location further comprises the substep of performing a mean best-fit plane approximation technique.

15. A method according to claim 13, wherein the step (c) of identifying a first grind area and a second grind area further comprises the substep of identifying the first grind area and the second grind area sequentially.

16. A method according to claim 13, wherein the step (c) of identifying a first grind area and a second grind area further comprises the substeps of:
   (c1) ascertaining the location of the first contact point on the spool;
   (c2) determining the first grind area according to the location of the first contact point on the spool and specifications for the spool;
   (c3) transposing the location of the second contact point from the valve body onto the spool; and
   (c4) determining the second grind area according to the location of the second contact point on the spool and specifications for the spool.

17. A method according to claim 16, wherein the substep (c1) of ascertaining the location includes transposing the location of the first contact point from the valve body onto the spool by determining the location of the first contact point on the valve body and the location of the first contact point on the spool in relation to a reference position.

18. A method according to claim 16, wherein the substep (c3) of transposing the location includes determining the locaton of the second contact point on the valve body and the location of the second contact point on the spool in relation to a reference position.

19. A method according to claim 16, wherein the substep (c1) of ascertaining the location includes selecting an arbitrary position on the spool as the location of the first contact point on the spool.

20. A method according to claim 16, wherein the substep (c3) of transposing the location includes determining the location of the second contact point on the spool based upon the distance between the first contact point and the second contact point on the valve body.

21. A method according to claim 16, wherein the substep (c3) of transposing the location includes determining the location of the second contact point on the spool based upon the distance between the first contact point and the second contact point on the valve body.

22. A method according to claim 18, wherein the substep (c3) of transposing the location includes adjusting the location of the second contact point on the spool.

23. A method according to claim 18, wherein the substep (c4) of determining the second grind area includes determining the second grind area based upon the location of the first contact point on the spool.

24. A method according to claim 13, wherein the step (d) of grinding the first grind area and the second grind area further comprises the substep of grinding the first grind area and the second grind area sequentially.

25. A method according to claim 15, further comprising the step of:
   (e) qualifying at least one datum based upon the location of one of the contact points on the spool.

26. A method for matching lands in a spool valve for a fuel injector, wherein the spool valve has a valve body forming an inside surface having an inside diameter to receive a spool having an outside diameter and specifications defining the spool, the valve body having a plurality of contact points at locations where a plurality of body lands connect with a plurality of spool lands formed by a plurality of spool grooves on the spool, the method comprising the steps of:
   (a) measuring the inside surface;
   (b) determining the locations of the plurality of contact points on the valve body;
   (c) identifying a plurality of grind areas on the spool based on the locations of the plurality of contact points on the valve body; and
   (d) grinding the plurality of grind areas to form the plurality of spool grooves and the plurality of spool lands.

27. A method according to claim 26, wherein the step (c) of identifying a plurality of grind areas further comprises the substeps of:
   (c1) transposing the locations of the plurality of contact points from the valve body onto the spool; and
   (c2) determining the plurality of grind areas according to the locations of the plurality of contact points on the spool and specifications for the spool.

28. A method according to claim 26, wherein the step (c) of identifying a plurality of grind areas further comprises the substeps of:
   (c1) selecting a starting contact point from the plurality of contact points on the valve body;
   (c2) ascertaining the location of the starting contact point on the spool;
   (c3) transposing the locations of the remaining plurality of contact points onto the spool based on the positions of the remaining plurality of contact points in relation to the starting contact point; and
   (c4) determining the plurality of grind areas according to the location of the starting contact point, the locations of the remaining plurality of contact points, and specifications for the spool.

29. A method according to claim 28, wherein the substep (c2) of ascertaining the location includes transposing the location of the starting contact point from the valve body to the spool.

30. A method according to claim 29, wherein the substep (c2) of ascertaining the location further includes determining the location of the starting contact point on the valve body and the location of the starting contact point on the spool in relation to a reference position.

31. A method according to claim 28, wherein the substep (c2) of ascertaining the location includes selecting an arbitrary position on the spool as the location of the starting contact point on the spool.

32. A method according to claim 28, wherein the substep (c3) of transposing the locations includes adjusting at least one location of the remaining plurality of contact points on the spool.

33. A method according to claim 26, further comprising the step of:
   (e) grinding at least one datum based upon the location of one of the plurality of contact points.

34. A method for matching lands in a spool valve for a fuel injector, wherein the spool valve includes a valve body having an inside diameter for receiving a spool with an outside diameter, the spool having at least one contact point where at least one spool land connects with at least one body land formed by at least one body groove on the valve body, the method comprising the steps of:
   (a) measuring the outside diameter;
   (b) determining the location of the at least one contact point on the spool;
   (c) identifying at least one grind area on the valve body, the at least one grind area based on the location of at least one contact point on the spool; and
   (d) grinding the at least one grind area to form the at least one body groove and the at least one body land.

35. A method according to claim 34, wherein the step (a) of measuring the outside diameter comprises the substep of measuring the outside diameter of the spool.

36. A method according to claim 34, wherein the step (c) of identifying at least one grind area comprises the substeps of:
   (c1) transposing the location of the at least one contact point from the spool onto the valve body; and
   (c2) determining the least one grind area according to the location of the at least one contact point and specifications for the valve body.

37. A method according to claim 36, wherein the substep (c1) of transposing the location includes determining the location of the at least one contact point on the spool and the location of the at least one contact point on the valve body in relation to a reference position.

38. A method according to claim 36, wherein the substep (c1) of transposing the location includes adjusting the location of the at least one contact point on the valve body.

* * * * *